United States Patent Office 2,999,856
Patented Sept. 12, 1961

2,999,856
POLYETHYLENE WAXES AND PROCESS
FOR PREPARING THEM
Herbert Bestian and Joachim Lange, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 9, 1958, Ser. No. 779,054
Claims priority, application Germany Dec. 19, 1957
10 Claims. (Cl. 260—94.9)

The present invention relates to high melting and waxy polyethylenes of low viscosity and to a process for their manufacture.

It is known to polymerize ethylene under a pressure of about 1000 atmospheres and more and at a high temperature with the use of radical-forming catalysts, such as peroxides, azonitriles, oxygen and the like, in order to obtain high molecular thermoplasts. On account of the strong reaction heat evolved said processes are carried out very often in the presence of water or organic solvents, such as benzene or chlorobenzene.

It is likewise known to produce low molecular polyethylenes partially having a waxy character under different conditions, for example under lower pressures (about 200 to 500 atmospheres). With a melting point above 100° C. said waxy polyethylenes possess, however, relatively high melting viscosities. Numerous references to the various polymerization processes are to be found in the monograph "High Polymer," volume 11, Polyethylene, by Raff and Allison, pages 61 to 66 (Interscience Publishers, New York—London, 1956).

Low viscous and high melting polyethylene waxes can also be obtained by processes carried out in the presence of alcohols or other suitable solvents, such as malonic esters, ketones, acetals etc. One process is performed, for example, under pressures below 300 atmospheres and at temperatures of about 100° C., particularly with the use of benzoyl peroxide as catalyst (German Patent 745,425). In another process the polymerization is realized with the use of isopropanol as solvent and, for example, hydrogen peroxide as catalyst at about 200° C. and 400 atmospheres (U.S. Patent 2,683,141).

The aforesaid processes which are carried out in the presence of chain-transferring solvents involve, above all, the disadvantage that the low molecular portions must be removed after the polymerization, for example, by a steam distillation (U.S. Patent 2,683,141) or other suitable means.

Moreover, it is known that in the high pressure polymerization of ethylene to yield high molecular thermoplasts the ethylene used must be very pure. In order to obtain satisfactory products, especially the absence of carbon monoxide (British Patent 579,666), acetylene (British Patent 585,814), oxygen-containing compounds, such as aldehydes (British Patent 579,676) and hydrogen (British Patent 582,334) is required. The latter patent is supplemented by a known process for the manufacture of modified polyethylenes (U.S. Patent 2,387,755) which comprises carrying out the polymerization of ethylene under the usual conditions (1000 atmospheres, 200° C., presence of benzene and water, oxygen or benzoyl peroxide as catalyst) in the presence of hydrogen. According to said process hard and viscous products are obtained in the absence of hydrogen, whereas semi-soft and pasty products are produced in the presence of 0.1 to 10% by weight (about 1.3 to 61% by volume) of hydrogen, preferably 0.5 to 2.5% by weight (about 7 to 26% by volume) of hydrogen. The viscosities of the polyethylenes prepared under the aforesaid conditions decrease as the content of hydrogen increases. Simultaneously a strong decrease of the softening points can be observed; a polyethylene prepared, for example, with less than 0.2% by volume of hydrogen has a softening point of 81° C., whereas a content of about 10% by volume of hydrogen in the ethylene reduces the softening point by 24° to 57° C.

In another process (U.S. Patent 2,482,877) the polymerization of ethylene initiated by means of peroxides is carried out at 180° C. in the presence of saturated aliphatic hydrocarbons, such as methylcyclohexane. By the addition of nitrogen, hydrogen, carbon dioxide or methane it is possible to obtain a polymer which is even liquid at normal temperature instead of a polyethylene wax having a melting point of 73° C. Thus the melting point is reduced by more than 50° C.

Those skilled in the art were to learn from the two last-mentioned publications that the fundamental action of hydrogen in the polymerization of ethylene initiated by means of radical-forming agents, such as peroxides, consists, in addition to a reduction of the viscosity, above all in a considerable decrease of the melting point of the polymer, unless said action is only due to an inert gas effect since nitrogen, carbon dioxide and methane are said to have the same action.

In a further process (German Patent 864,150) a polyethylene is obtained, which can be drawn to filaments from the melt and consequently possesses high molecular properties, by polymerizing ethylene in the presence of small amounts of hydrogen and oxygen or oxygen-yielding substances (in the example 4%, 1000 atmospheres, 180° C., oxygen as catalyst). The term oxygen-yielding substances is defined, for example, in German Patent 745,425 of the same applicant, wherein there are described persulfates, percarbonates, perborates as well as benzoyl peroxide, peracetic acid, diacetyl peroxide, tolyl peroxide and oleyl peroxide obtainable from the acid chlorides with hydrogen peroxide in a sodium hydroxide solution. In German Patent 864,150 the action of hydrogen is attributed, above all, to its improved thermal conductivity. It is expressly denied that the hydrogen participates in the polymerization. In this case, too, it can be assumed that the hydrogen acts as inert gas.

In another process for the manufacture of polyethylenes of high density (Belgian Patent 554,173) ethylene is polymerized under pressures above 500 atmospheres, preferably above 1000 atmospheres, and at temperatures below 150° C., especially in the range from 15 to 110° C., in the presence of chain transfer agents and with the use of perhydroxy-dicarbonates or esters of hyponitrous acid or acyl peroxides substituted in $\alpha$-position as catalysts.

As chain transfer agents there are mentioned carbon tetrachloride, chloroform, hydrogen, preferably in an amount of 0.5 to 2.5% by volume, hexachloroethane, chlorinated carboxylic acids or the alkyl esters thereof, aldehydes, alkyl esters of inorganic oxyacids of sulfur, phosphorus or silicium as well as sulfur halides and mercaptanes. The products obtained possess a pronounced high molecular, plastic-like character as results from the examples in which the polymerization is brought about at temperatures in the range from 15 to 95° C. and under pressures from 1000 to 2000 atmospheres. It is pointed out that di-tert.-butyl peroxide is not suitable as catalyst in said process. A specific action of the hydrogen is not set forth. The essential feature of the process seems to be the fact that the polymers obtained have densities of about 0.95 gram per cubic centimeter.

Ethylene polymers of high density have, however, already been prepared earlier by polymerizing at low temperature. According to the process described in U.S. Patent 2,586,322, for example, a polyethylene is produced having a density of 0.950 gram per cubic centimeter at 75° C. and 1000 atmospheres with the use of cyclohexane as chain transfer agent. By the process of British Patent 721,678 ethylene polymers having a density of 0.946 gram per cubic centimeter are obtained at about 40° C. and under 1000 atmospheres in the presence of a redox catalyst, and British Patent 682,420 describes a process wherein a polyethylene which even has a density of 0.980 gram per cubic centimeter is prepared at 0° C. and under about 38 atmospheres in the presence of redox catalysts.

On account of the aforesaid publications it becomes evident to those skilled in the art that the high density of the polyethylenes produced by the process of Belgian Patent 554,173 is essentially due to the low polymerization temperature and not to the presence of chain transfer agents, particularly hydrogen.

Now we have found that waxy, low molecular polyethylenes having a flowing/dropping point of 100 to 115° C., a melt viscosity of 100 to 3000 centistokes at 120° C. and a crystalline portion of 55 to 75% can be produced by polymerizing ethylene with the addition of 5 to 30% by volume of hydrogen at a temperature in the range from 120 to 180° C. and under a pressure ranging from 300 to 600 atmospheres while using as catalyst radical-forming substances, if desired in the presence of benzene. The term "flowing/dropping point" as used herein is defined according to the German standard DIN 53654 as follows:

A wax sample is melted into a receptacle provided with a thermometer and a defined outlet opening, allowed to cool, and slowly heated. The flowing point is defined by that temperature at which the substance tested under the test conditions forms a distinct tip at the lower end of the receptacle. The dropping point is defined by that temperature at which the first drop of the melting substance falls off the receptacle.

When the polymerization is carried out in the presence of benzene, it is of advantage to use sulfur-free benzene in an amount by weight of up to ten times the weight of the ethylene used. The benzene may either be placed first into the reaction vessel or introduced together with or separately from the ethylene.

The process of the invention represents an advance as compared with known processes since it enables the polymerization so as to obtain high melting polyethylene waxes of low viscosity in the absence of solvents having a chain transferring action. Thus it is no longer necessary to work up the reaction mixture after the polymerization in order to separate the low molecular telomeric portions. Simultaneously the formation of cross-linked portions in the reaction system is avoided by the strong reduction of the viscosity and, in connection therewith, of the molecular weight.

As catalysts there may be used all radical-forming substances known in industry, as enumerated, for example, in the above-mentioned monograph by Raff and Allison, such as organic peroxides, more especially dialkyl peroxides, for example di-tert.-butyl peroxide; alkyl hydroperoxides, such as tertiary butyl hydroperoxide or cumene hydroperoxide; acyl peroxides, for example acetyl or benzoyl peroxide; organic peracids, for example perbenzoic acid; or the esters thereof; inorganic peroxides, for example hydrogen peroxide or persulfates; aliphatic azo-compounds, such as azoisobutyronitrile and the like. In the process of the invention the redox systems known as catalysts may be used, too. The catalyst is used in an amount of 0.05 to 1% by weight, calculated on the ethylene.

From among the numerous radical-forming compounds suitable in the process of the present invention the di-tert.-butyl peroxide already known as polymerization catalyst proved to be particularly qualified in the present process since:

(1) It is available in a very pure quality at a cheap price, (2) It is well miscible with gaseous compressed ethylene, (3) It is liquid at room temperature, (4) It is not sensitive to shock and can, therefore, be used in industry without danger of explosion, (5) It can be easily introduced into the highly compressed ethylene by means of normal dosing pumps for the reasons set forth sub items 3 and 4, (6) It gives excellent yields of polymers, (7) It does not form corrosive fractions so that the polymerization can take place in tubes of normal high pressure steel and the use of expensive, stainless steels as construction material can be dispensed with, (8) It possesses an appropriate decomposition velocity at the reaction temperature required in the present process.

When using di-tert.-butyl peroxide as catalyst it is advisable to admix the ethylene with 10 to 15% by volume of hydrogen and to carry out the polymerization at a temperature in the range from 150 to 180° C. and under a pressure ranging from 300 to 500 atmospheres. The products so obtained have a flowing/dropping point of 105 to 109° C., a melting viscosity of 400 to 2000 centistokes at 120° C. and contain a crystalline portion of 60 to 65%.

The present process may be carried out discontinuously or continuously. The polymerization of ethylene may be carried out continuously in the presence of the appropriate amount of hydrogen in a tube-shaped reaction chamber with the use of a radical-forming catalyst, if desired in the presence of benzene (benzene does not act as chain transfer agent). By cooling the reaction chamber the temperature of the reaction mixture is maintained within the desired limits. The reaction mixture is removed from the reaction chamber, the wax is separated and the other reaction components are recycled and re-used after the consumed portions have been replaced. The conversion amounts to 10 to 50% per passage.

The following examples serve to illustrate the invention but they are not intended to limit it thereto.

In Examples 1–13 the polymerization was carried out continuously at 155 to 160° C. in a tube cooled with pressure water and with the use of about 0.05 to 0.1% by weight of di-tert.-butyl peroxide, calculated on the ethylene. About 10% were converted per passage and 150 to 180 grams of polymer were obtained on the average per gram of di-tert.-butyl peroxide.

The following Examples 1 to 6 are intended to show the influence of hydrogen on the melting point and the melt viscosity of the low molecular, waxy polyethylenes obtained.

| Example No. | Atm. | Percent by volume of hydrogen | Flowing/dropping point ° C. | Melt viscosity at 120° C. centistokes |
|---|---|---|---|---|
| 1 | 330 | 0.1 | 106/107 | 7,000 |
| 2 | 330 | 5.0 | 105/106 | 1,700 |
| 3 | 350 | 0.1 | 106/108 | 10,000 |
| 4 | 350 | 6.5 | 107/108 | 2,600 |
| 5 | 370 | 0.1 | 107/109 | (¹) |
| 6 | 370 | 12 | 107.5/108 | 1,300 |

¹ Too high, not measurable.

It results from comparable Examples 1 and 2, 3 and 4, and 5 and 6 that the melting viscosity is considerably reduced by the addition of hydrogen whereas the melting point does not decrease or decreases slightly only by at most 1° C.

The influence of hydrogen is still more striking when products are compared which have been produced under approximately the same partial pressure of ethylene.

TABLE II

| Example No. | Atm. | Percent by volume of hydrogen | Flowing/dropping point °C. | Melt viscosity at 120° C. centistokes |
|---|---|---|---|---|
| 1 | 330 | 0.1 | 106/107 | 7,000 |
| 6 | 370 | 12 | 107.5/108 | 1,300 |
| 7 | 420 | 20 | 106/107 | 380 |

In spite of the strongly decreasing melt viscosity the melting points remain constant or increase even slightly.

The two following Examples 8 and 9 are intended to show the influence of the addition of hydrogen on the viscosity and the crystallinity of the polymer. The crystalline portion was determined by X-ray analysis. The experiments were carried out continuously at 160° C. as described above.

TABLE III

| Ex. No. | Pressure | Flowing/dropping point °C. | Melt viscosity 120° C. centistokes | Crystalline portion percent |
|---|---|---|---|---|
| 8 | 340 atm. ethylene 0 atm. hydrogen. 340 atm. total pressure. | 105/106 | 7,800 | 53 |
| 9 | 340 atm. ethylene 80 atm. hydrogen. 420 atm. total pressure. | 105/106 | 490 | 62 |

The unfavorable influence of higher temperatures is shown in Examples 10 and 11 which were carried out in the same manner as Example 7 under 420 atmospheres, but at 210 or 190° C. respectively and with 15% of hydrogen.

TABLE IV

| Example No. | Atm. | Temperature °C. | Percent by volume of hydrogen | Flowing/dropping point °C. | Melt viscosity at 120° C. centistokes |
|---|---|---|---|---|---|
| 10 | 420 | 210 | 15 | 95/96 | 380 |
| 11 | 420 | 190 | 16 | 100/101 | 400 |

The products so obtained have an analogous melt viscosity but a considerably lower flowing/dropping point in spite of the lower hydrogen content as compared with Example 7. The polymers are, furthermore, considerably softer and possess penetrometer values far above 5 in contradistinction to the products of Examples 6 and 7 which have penetrometer numbers of about 1 to 3 (determined according to ASTM D5-25 at 25° C., 5 seconds, 100 grams; penetrometer number=penetration depth in 1/10 mm.).

It is not suitable to carry out the polymerization at a temperature below 120° C., on the one hand on account of the increase associated therewith of the melt viscosity of the wax resulting in a prolonged time of stay of the polymer in the reaction vessel and consequently a deterioration of the wax quality and, on the other hand because of the reduction of the polymerization rate below a rational degree.

For economic reasons it appears unsuitable to bring about the polymerization under pressures higher than indicated on account of the raised compression costs and the higher price of the installation. On the other hand lower pressures yield waxes having too low a melting point as shown in following Examples 12 and 13. It is peculiar that hydrogen considerably increases the melting point. The experiments were carried out discontinuously in an autoclave provided with magnetic stirrers.

TABLE V

| Ex. No. | Temperature °C. | Pressure | Flowing/dropping point °C. | Melt viscosity 120° C. centistokes |
|---|---|---|---|---|
| 12 | 170 | 200 atm. ethylene. 0 atm. hydrogen. 200 atm. total pressure. | 91/92 | 800 |
| 13 | 170 | 200 atm. ethylene. 200 atm. hydrogen. 400 atm. total pressure. | 100/101 | 340 |

On account of the detailed description of the present process given in the examples it becomes evident that the polymerization of ethylene to yield high melting waxes of a low viscosity in the presence of hydrogen can only be carried out successfully under the indicated conditions, particularly the temperature and pressure ranges. This was not to be foreseen according to the state of the art described above. The high melting, low molecular polyethylene waxes of a low viscosity produced by the process of the invention in a simple manner may be used in the manufacture of cleaning materials, candles, construction materials, plastics, in electrical engineering and, above all, for the manufacture of packing materials.

It was surprising, for example, that when the polyethylene waxes having a low viscosity produced by the process of the invention are used together with paraffin waxes for the manufacture of wax paper according to known processes, brilliant wax films can be obtained even in case the cooling temperature is 20° C. When known paraffin-polyethylene wax melts are used a high gloss can only be produced at a cooling temperature of +10° C. or, preferably, below +5° C., necessitating expensive cooling means. As compared therewith, the cooling temperature of 20° C. can easily be maintained by simple water cooling. The low viscosity of the polyethylene wax according to the invention furthermore enables a more rapid paper feeding in the installations for the manufacture of wax paper and thus an increase of the throughput.

The following example illustrates the coating of paper with a wax partially consisting of the polyethylene wax of the invention.

Example 14

In order to produce highly brilliant coatings a wax melt is prepared consisting of 15 to 97% of a suitable paraffin wax and 3 to 85% of a polyethylene wax obtained by the process of the invention. It is of advantage to use 5 to 30% of the novel polyethylene wax. The material to be coated, particularly paper and paper-like products, is passed with great velocity through the molten wax mixture maintained at a temperature of about 100° C. The coated paper is then cooled in suitable manner, for example by means of cooling rollers or directly in a water bath, to the temperature necessary for producing a high surface gloss, at least, however, to 20° C.

Already small amounts of the novel polyethylene wax admixed with paraffin waxes cause, in addition to the improvement of the gloss, a considerable increase of the melting and blocking point as well as an important improvement of the mechanical properties, such as hardness, stability and flexibility. The mixtures are, furthermore, characterized by a high hot-sealing stability. For the coating there are used commercial paraffin waxes having a melting point of, for example, 60° C.

We claim:

1. A process for the manufacture of a low molecular, waxy polyethylene having a flowing/dropping point in the range between 100 and 115° C., a melt viscosity at 120° C. in the range between 100 and 3000 centistokes and a crystalline portion between 55 and 75%, which comprises polymerizing ethylene with an addition of 5 to 30% by volume of hydrogen (the percentage being calculated on the mixture of ethylene and hydrogen) at a temperature in the range between 120 and 180° C. and a pressure in the range between 300 to 600 atmospheres gauge in the presence of di-tert-butyl peroxide catalyst and under substantially anhydrous conditions.

2. The process of claim 1, wherein the polymerization is effected in the presence of benzene.

3. The process of claim 1, wherein the polymerization is carried out in the presence of up to 10 parts by weight of benzene per one part by weight of ethylene.

4. Low molecular, wavy polyethylene having a flowing/dropping point in the range between 100 and 115° C., a melt viscosity at 120° C. in the range between 100 and 3000 centistokes and a crystalline portion between 55 and 75%, said waxy polyethylene being prepared by the process of claim 1.

5. Low molecular, waxy polyethylene having a flowing/dropping point in the range between 105 and 109° C. and a melt viscosity at 120° C. in the range between 400 and 2000 centistokes and a crystalline portion of 60 to 65%, said waxy polyethylene being prepared by the process of claim 1.

6. A process for the manufacture of a low molecular, waxy polyethylene having a flowing/dropping point in the range between 100 and 115° C., a melt viscosity at 120° C. in the range between 100 and 3000 centistokes and a crystalline portion between 55 and 75%, which comprises introducing a mixture containing 5 to 30% by volume of hydrogen and the balance of ethylene into a reaction vessel while maintaining a temperature between 120 and 180° C., a pressure of 300 to 600 atmospheres gauge, and substantially anhydrous conditions, adding simultaneously a catalytic amount of di-tert-butyl peroxide catalyst, and separating the waxy product from the reaction mixture.

7. A process for the manufacture of a low molecular, waxy polyethylene having a flowing/dropping point in the range between 105 and 109° C. and a melt viscosity at 120° C. in the range between 400 and 2000 centistokes and a crystalline portion of 60 to 65%, which comprises polymerizing ethylene with an addition of 10 to 15% of hydrogen (the percentages being by volume calculated on the ethylene/hydrogen mixture) at a temperature in the range between 150 and 180° C. and a pressure in the range between 300 and 500 atmospheres gauge in the presence of a catalytic amount of di-tert.-butyl peroxide and under substantially anhydrous conditions.

8. The process of claim 7, wherein the polymerization is effected in the presence of benzene.

9. The process of claim 7, wherein the polymerization is carried out in the presence of up to 10 parts by weight of benzene per one part by weight of ethylene.

10. A process for the manufacture of a low molecular, waxy polyethylene having a flowing/dropping point in the range between 105 and 109° C. and a melt viscosity at 120° C. in the range between 400 and 2000 centistokes and a crystalline portion of 60 to 65%, which comprises introducing a mixture containing 10 to 15% by volume of hydrogen and the balance of ethylene into a reaction vessel while maintaining a temperature between 150 and 180° C., a pressure between 300 and 500 atmospheres gauge and substantially anhydrous conditions, adding simultaneously 0.05 to 0.1% of di-tert.-butyl peroxide, calculated on the amount of ethylene, and separating the waxy product from the reaction mixture.

References Cited in the file of this patent

UNITED STATES PATENTS

| | | |
|---|---|---|
| 2,387,755 | Hanford | Oct. 30, 1945 |
| 2,586,322 | Franta | Feb. 19, 1952 |
| 2,842,508 | Sterk | July 8, 1958 |
| 2,859,190 | Cubberley et al. | Nov. 4, 1958 |
| 2,865,903 | Seed | Dec. 23, 1958 |

FOREIGN PATENTS

| | | |
|---|---|---|
| 645,088 | Great Britain | Oct. 25, 1950 |
| 582,334 | Great Britain | Nov. 13, 1956 |